United States Patent [19]
Watts et al.

[11] Patent Number: 5,126,637
[45] Date of Patent: Jun. 30, 1992

[54] LUMINOUS POWER SUPPLY WITH IMPROVED TRANSFORMER MEANS

[75] Inventors: Gary P. Watts, Buffalo Grove; Richard A. Johnson, Barrington, both of Ill.

[73] Assignee: WDS, Inc., Oswego, Ill.

[21] Appl. No.: 589,136

[22] Filed: Sep. 26, 1990

Related U.S. Application Data

[63] Continuation-in-part of Ser. No. 438,819, Nov. 16, 1989.

[51] Int. Cl.[5] ............................................. H05B 37/02
[52] U.S. Cl. ............................. 315/219; 315/DIG. 4; 315/DIG. 7
[58] Field of Search .................. 315/219, 307, 209 R, 315/224, DIG. 4, DIG. 7, 277; 363/41, 21, 132, 133; 336/178

[56] References Cited

U.S. PATENT DOCUMENTS

| | | | |
|---|---|---|---|
| 3,155,875 | 11/1964 | Wenrich | 315/277 |
| 4,392,085 | 7/1983 | Knoll | 315/DIG. 7 |
| 4,700,147 | 10/1987 | Roccucci | 363/133 |
| 4,717,863 | 1/1988 | Zeiler | 315/DIG. 4 |
| 4,791,338 | 12/1988 | Dean | 315/DIG. 4 |
| 4,920,302 | 4/1990 | Konopka | 315/307 |
| 4,950,959 | 8/1990 | Beckrot | 315/DIG. 7 |
| 4,980,611 | 12/1990 | Orenstein | 315/219 |
| 5,001,386 | 3/1991 | Sullivan | 315/219 |

*Primary Examiner*—Eugene R. LaRoche
*Assistant Examiner*—Amir Zarabian
*Attorney, Agent, or Firm*—Rosenblum, Parish & Isaacs

[57] ABSTRACT

A luminous power supply apparatus for driving gas discharge devices and the like with relatively high frequency voltages including an output transformer having a primary winding and a secondary winding across which a device to be powered may be connected, transistorized switches connected to the primary winding for providing pulses of alternating polarity thereto when driving, a pulse width modulator for driving the switches at an RF frequency, and a controller for selecting the width of the drive pulses to control the power applied to the device to be powered. The output transformer is comprised of: a pair of U-shaped core members having their corresponding ends joined together to form a unitary core; a primary winding wound about one side of the core and overlying a first junction of the pair of core members; a secondary winding wound about an opposite side of the core and overlying a second junction of the pair of core members; and potting means having a coefficient of resistance of 3.2 or less disposed about the secondary winding to inhibit power loss due to RF leakage from the secondary winding to a relative ground plane.

30 Claims, 10 Drawing Sheets

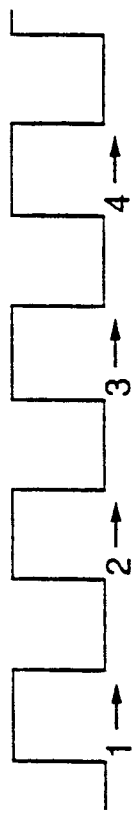
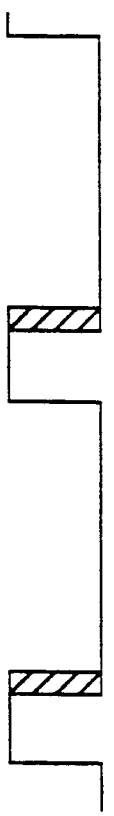
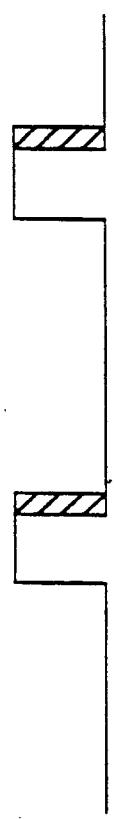
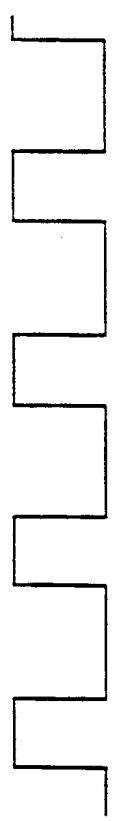
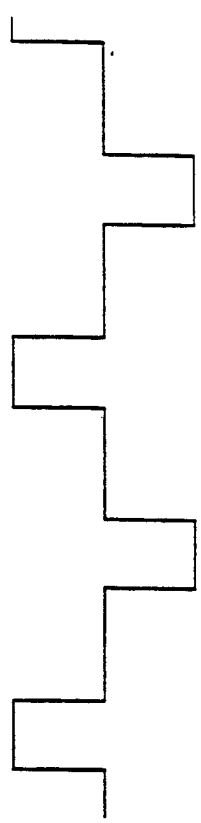
Fig. 5a  CLOCK PERIODS
Fig. 5b  18
Fig. 5c  20
Fig. 5d  CURRENT DETECT
Fig. 5e  SECONDARY WINDING 154

LUMINOUS POWER SUPPLY WITH IMPROVED TRANSFORMER MEANS

This Application is a Continuation-in-Part of our earlier filed U.S. application Ser. No. 438,819, filed Nov. 16, 1989.

BACKGROUND OF THE INVENTION

1. Field of the Invention

The present invention relates generally to luminous power supplies, and more particularly to an improved luminous power supply capable of efficiently operating at high frequencies and low voltages.

2. Background of the Invention

Conventionally, neon lighting tubes have been stimulated by alternating currents at high voltages stepped up from power main currents at frequencies of 50 to 60 hertz. Such low frequencies require large diameter cores in transformers, resulting in heavy weights which often preclude neon lights from being used in remote or difficultly accessed locations.

If made available, lamp driver currents at increased frequencies are equally transformable by decreased diameter transformers. In U.S. Pat. No. 4,742,278 by Iannini, a gas discharge display is energized by current at a frequency of approximately 20 kHz, which is adjustable to vary the portions illuminated along the length of the tube as a function of their capacitances. U.S. Pat. No. 4,843,627 by Stebbins discloses a neon light driven by high (at least 20 kHz) frequency squarewave currents in bursts admitted through gates enabled during the envelopes of pulses whose "width" is modulated in a voltage controlled oscillator (VCO) according to signal input times and voltages. Variable-length envelopes of clock signals are succeeded by fixed-length interruptions, so the resultant "pulse width modulated" waveforms do not have regular periods.

Although suitable electronic switching circuitry has been known for some time, to date no suitable combination of electronics and high frequency transformer has been provided capable of efficiently and reliably driving gas discharge devices such as neon tubes and fluorescent lamps.

SUMMARY OF THE INVENTION

It is therefore an object of the present invention to provide an improved power supply for driving gas discharge devices such as neon tubes and fluorescent lamps.

It is another object of the present invention to provide a neon tube and fluorescent lamp driver with a low mass transformer outputting currents at high frequencies with adjustable average amperages to control light intensities.

It is a further object of the present invention to provide a neon tube and fluorescent lamp power supply with safeguards against accidental short-circuit or overload currents.

A still further object of the present invention is to provide a neon tube and fluorescent lamp driver having an improved output transformer construction which enables the driver to deliver full power to a load with minimal inherent loss due to resistive and capacitive loading.

IN THE DRAWING

FIGS. 5a through 5e are waveforms appearing at various points in the power supply.

Figure 7A:
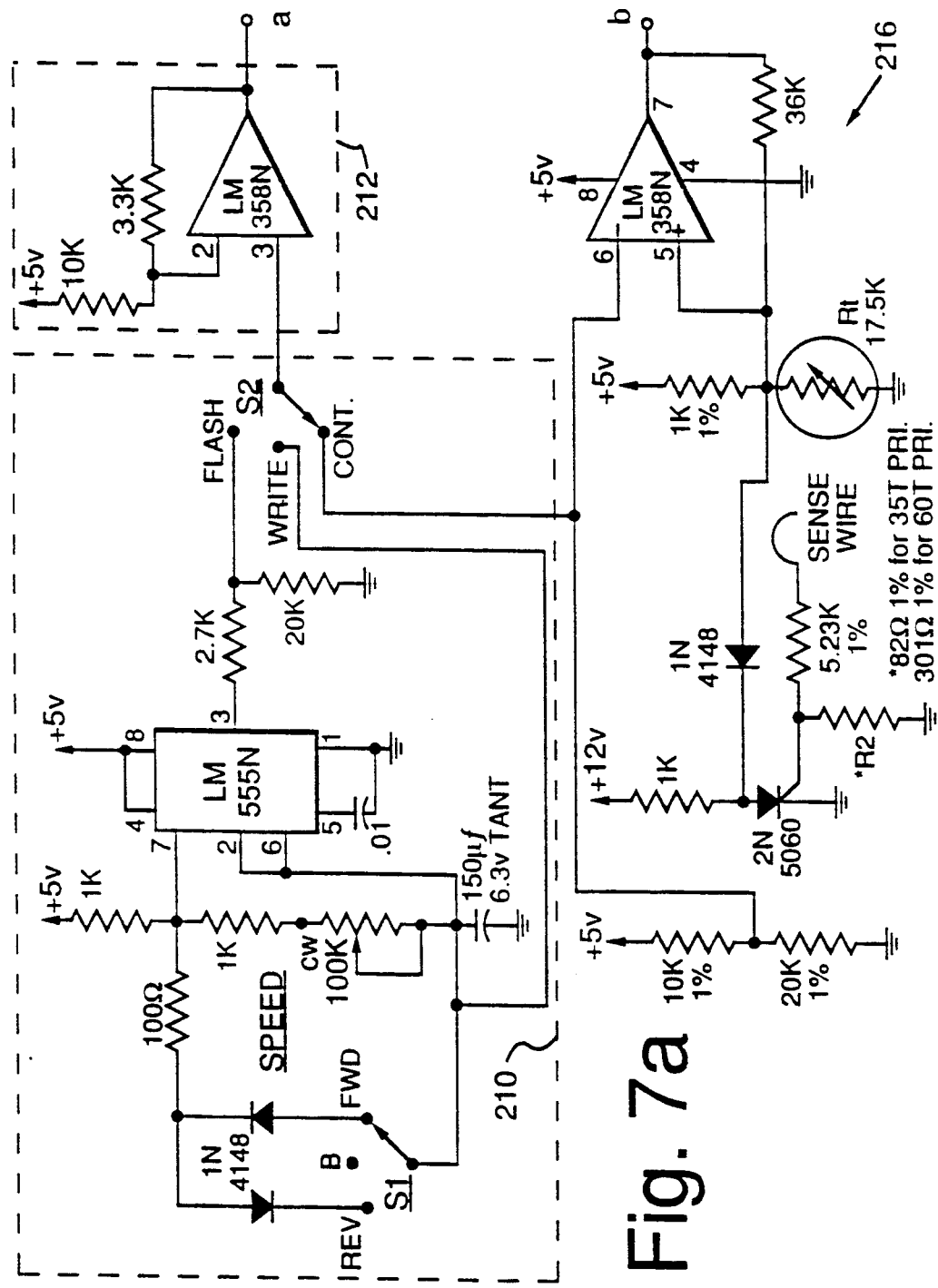
Figure 7B:
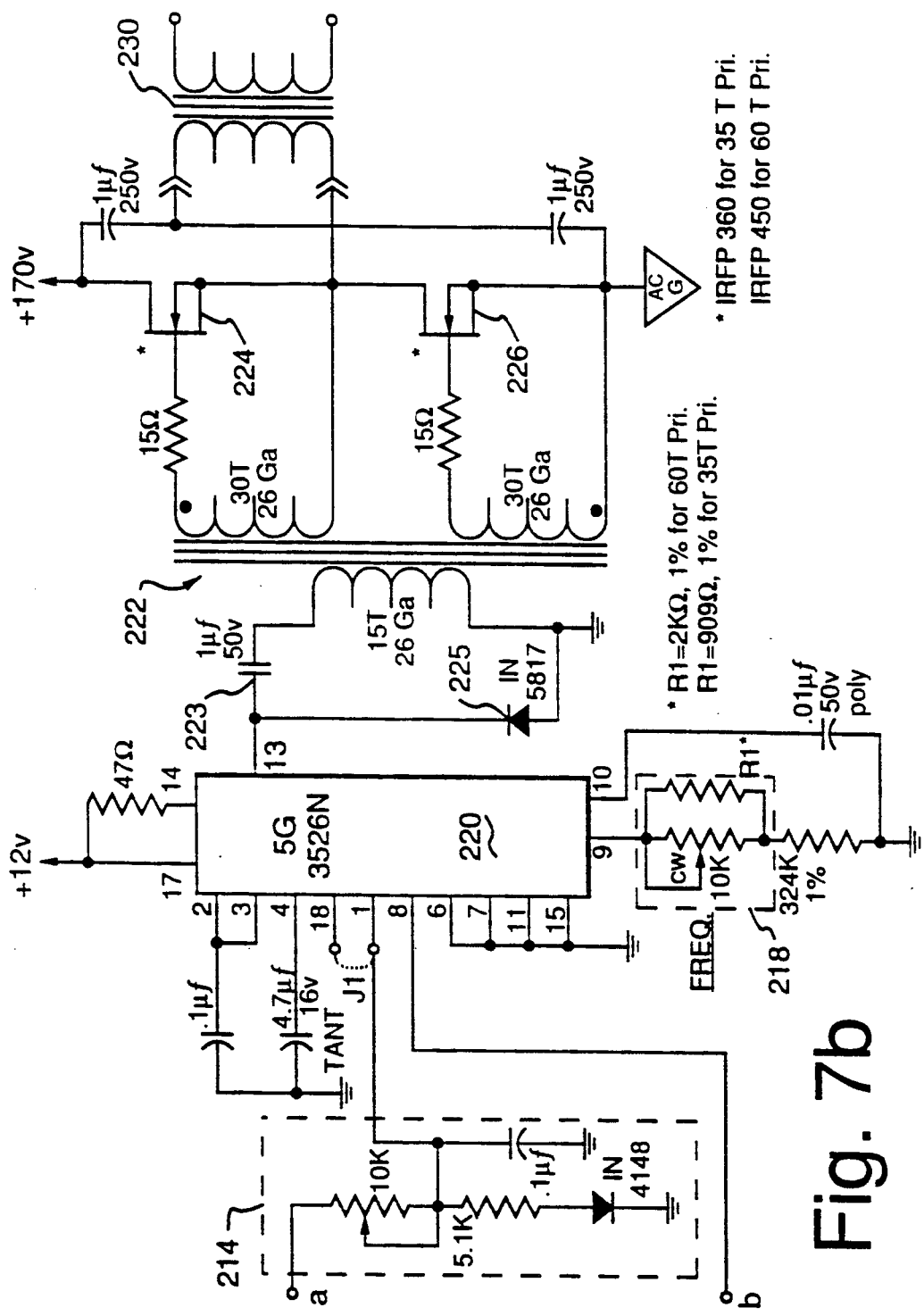

FIGS. 7a and 7b comprise a schematic diagram illustrating a 110VAC power supply apparatus in accordance with the present invention.

Figure 8:
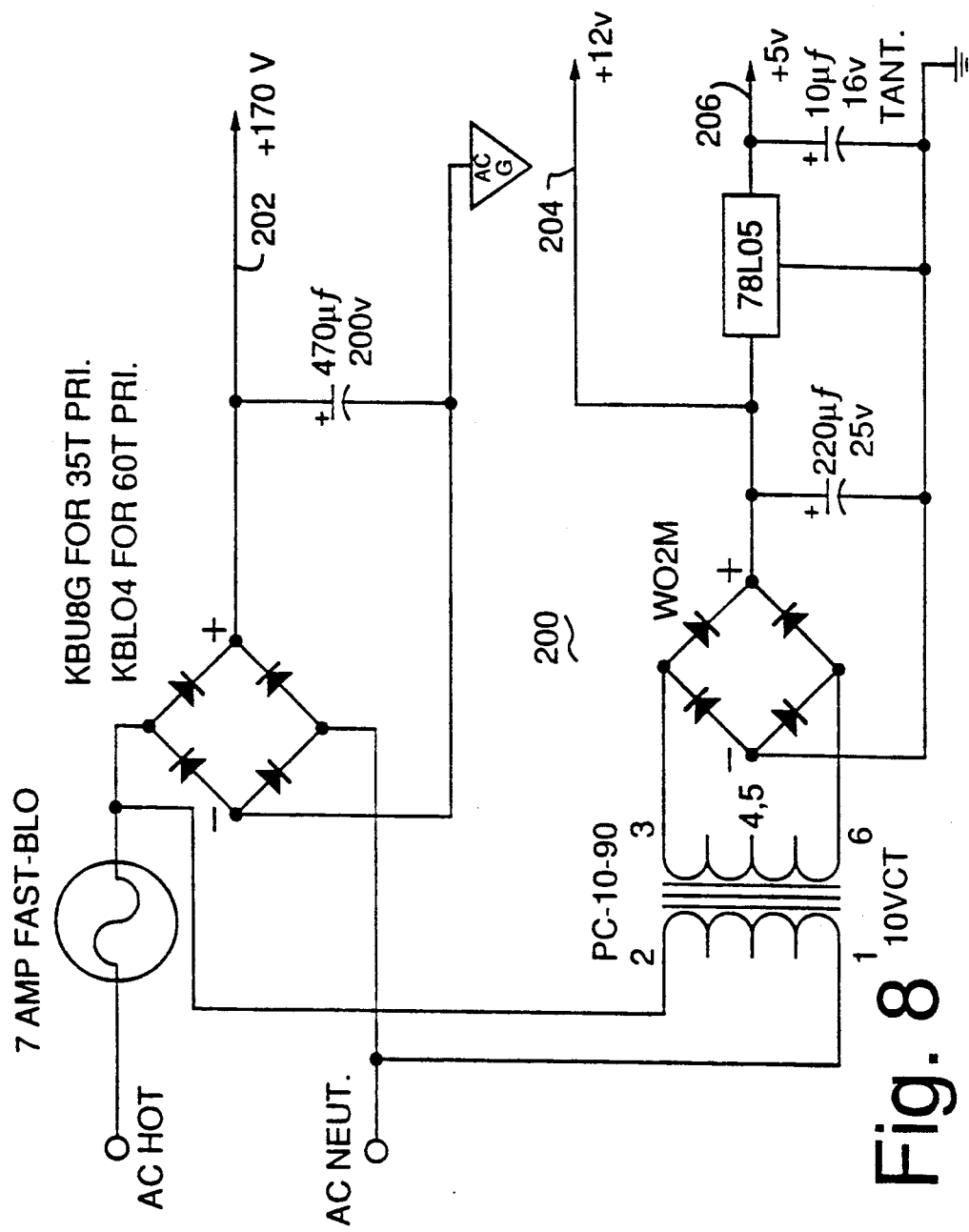

FIG. 8 is a schematic diagram illustrating the AC to DC converter for the circuit of FIG. 7.

Figure 9:
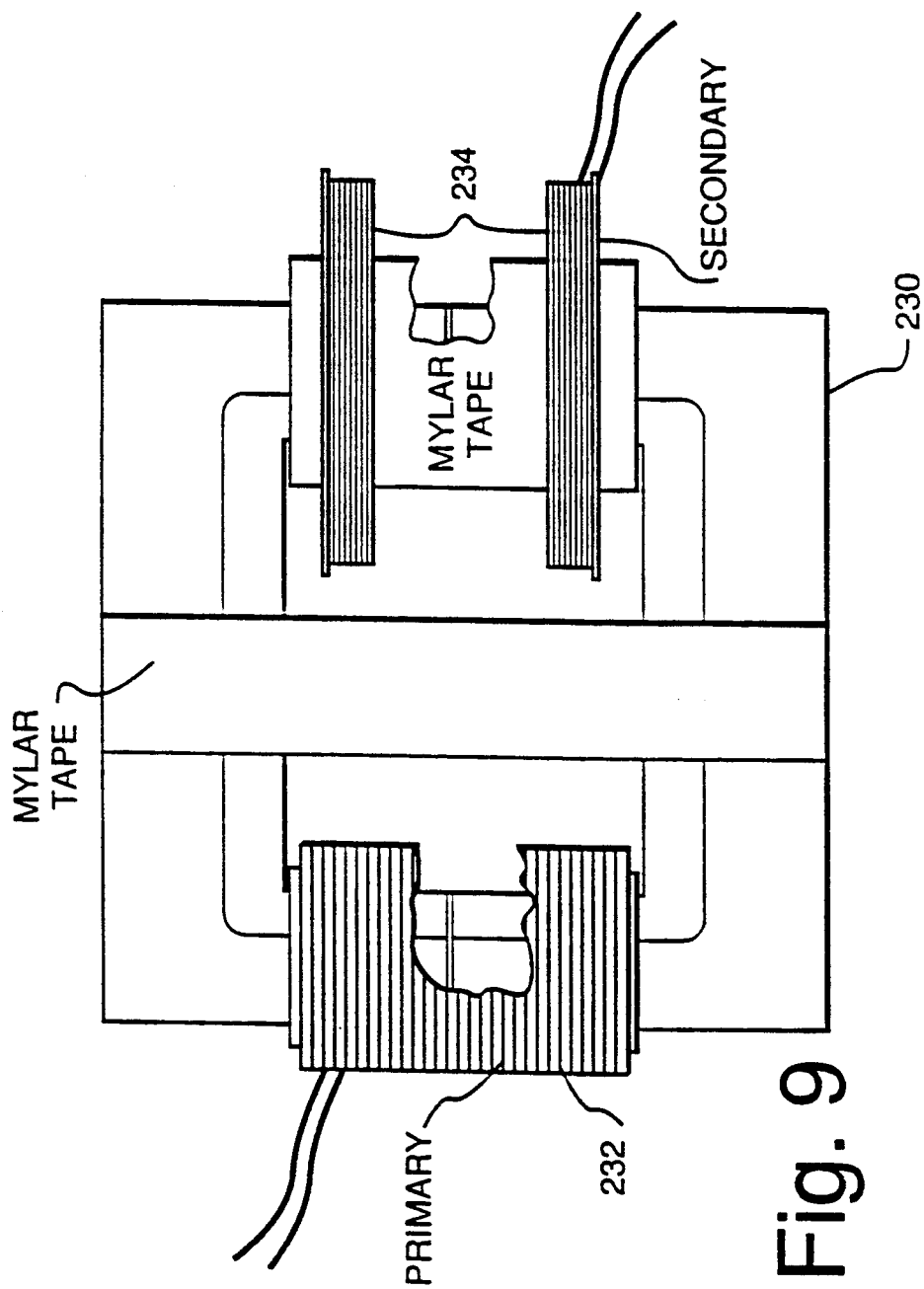

FIG. 9 is a diagram illustrating an output transformer in accordance with the present invention.

DETAILED DESCRIPTION OF THE PREFERRED EMBODIMENT

Figure 1:
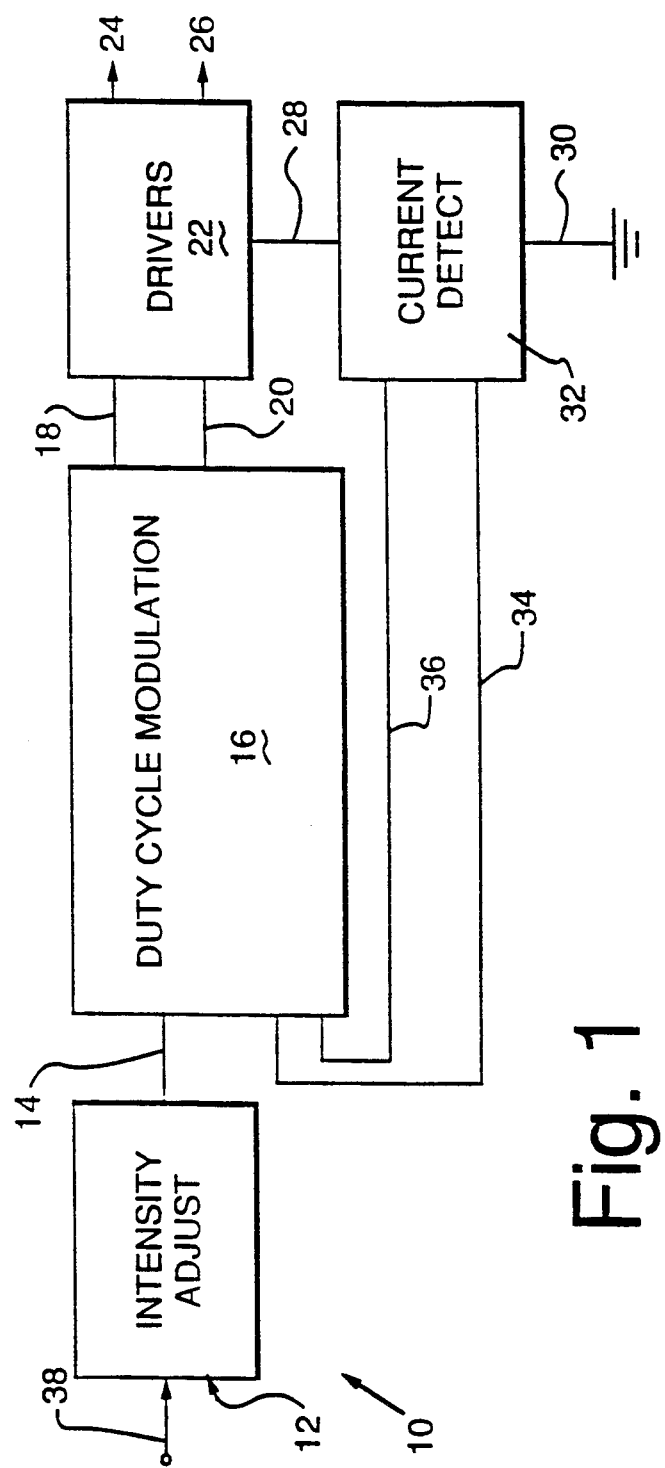
FIG. 1 is a simplified block diagram of a power supply according to the present invention.

Referring to FIG. 1, one embodiment of the present invention to be powered by a DC source is shown in a simplified representation and designated as power supply 10. This embodiment includes an intensity adjustment circuit 12 which provides duty cycle modulation voltages on line 14; a duty cycle modulation circuit 16 which receives the duty cycle modulation voltages and responsively modulates constant frequency pulses which are output as driver signals on lines 18 and 20; a driver circuit 22 which receives the driver signals and enables conduction through driver power current leads 24 and 26; and, connected between a driver lead 28 and ground 30, an optional current detector 32 for feeding output current measurements via lines 34 and 36 back to duty cycle modulation circuit 16.

Figure 2:
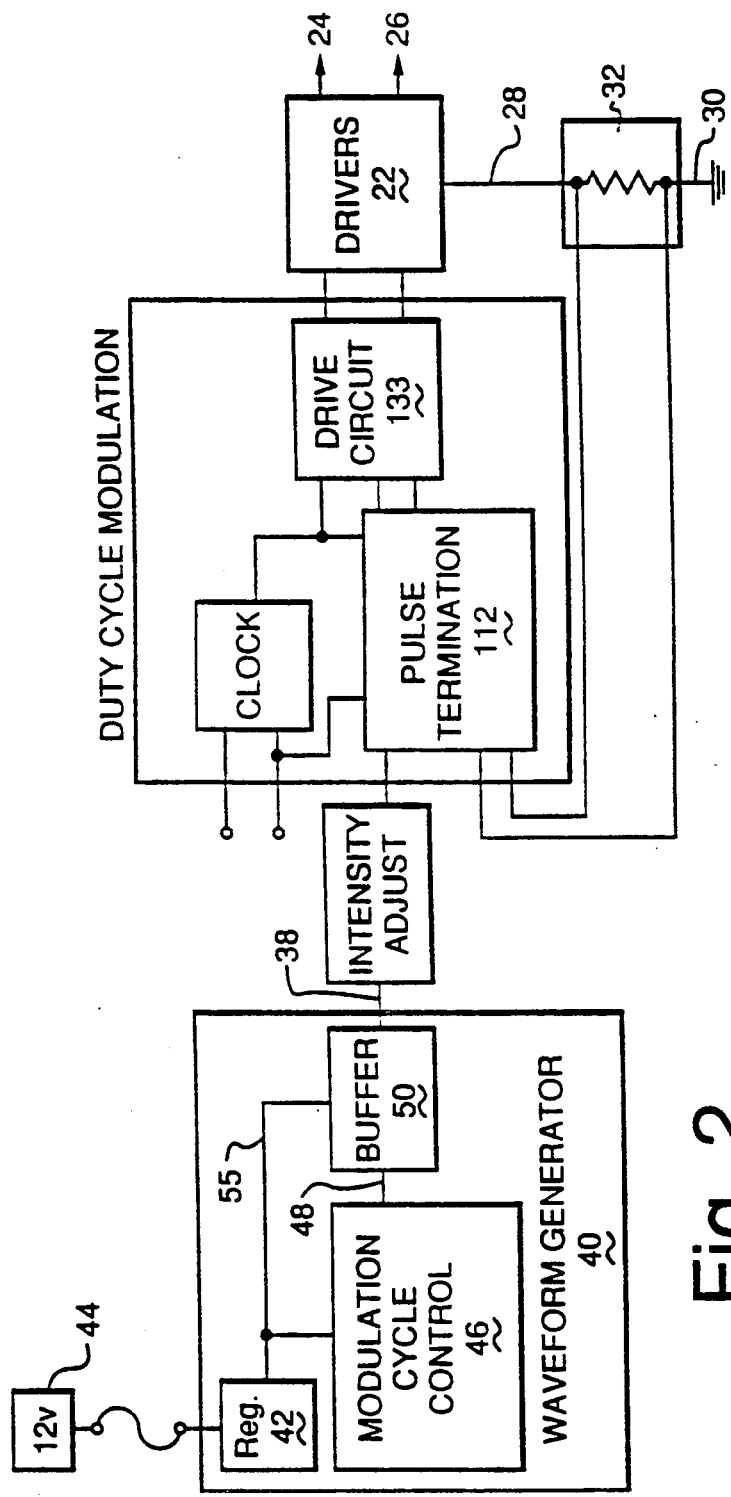
FIG. 2 is a block diagram of a preferred embodiment of the power supply according to the invention.

Intensity adjustment circuit 12 uses a minimum voltage level on line 38 derived from either a constant reference voltage source (which may be the Vref terminal of duty cycle modulation circuit 16), or preferably from a "duty cycle modulation waveform" output of a waveform generator. Referring to FIG. 2, the preferred waveform generator 40 includes a +5 volt supply current regulator 42 (preferably part 78L05) powered by a direct current of for example 12 volts from a suitable source 44; a "modulation cycle control" circuit 46 which provides a duty cycle modulation waveform output on line 48; and a buffer circuit 50.

Figure 3:
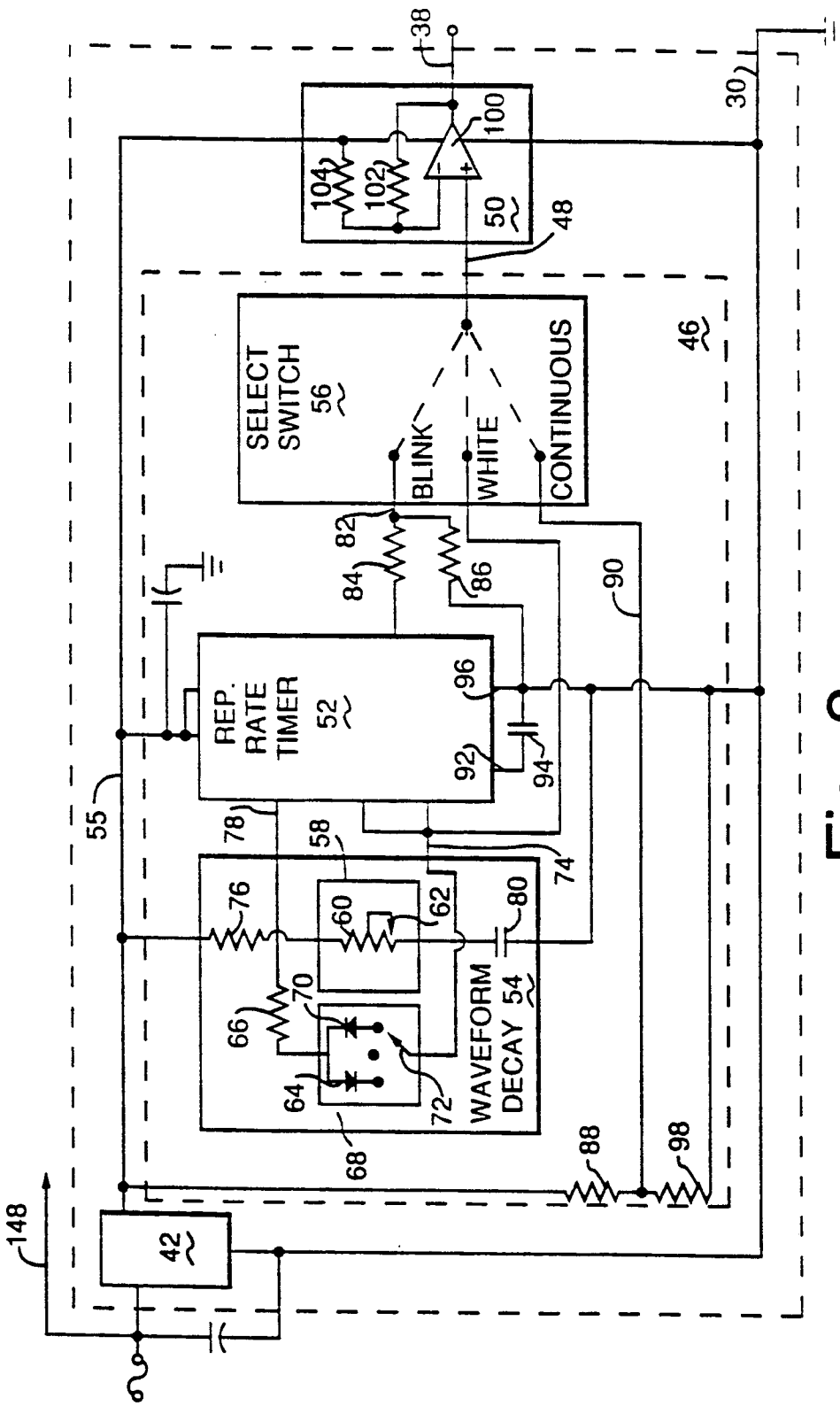
FIG. 3 is a more detailed schematic of the waveform generator shown in FIG. 2.

As further detailed in FIG. 3, modulation cycle control circuit 46 is made up of a repetition ("blink")-rate timer circuit 52, preferably IC part LM555N, a waveform decay circuit 54, and a lighting mode-select switch 56, preferably a SP3T switch which is manually operable by an operator of the power supply. Waveform decay circuit 54 includes a blink-speed control circuit 58 made up of a 1K resistor 60 in series with a user-adjustable 100K potentiometer ("pot") 62, and a ramp direction-selection switch 64 made up of 100 ohm resistor 66 connected to parallel oppositely oriented diodes 68 and 70, preferably parts IN4148, with their opposite ends connectable one at a time, by user-controllable switch 72, preferably a SPDT center-off switch, to line 74. A 1K ohm resistor 76 is connected from the 5 volt supply line 55 to timer line 78.

Lines 74 and 78 are biased by repetition rate timer 52 to provide positive or negative sloping ramp voltages for "writing" illumination along the length of a tube (not shown). Line 74 is applied to the "write" input terminal of user-controllable select switch 56, and is also connected through a 150 uf capacitor 80 to ground line 30. Repetition rate timer 52 also outputs, on line 82, a "flash" modulation cycle-control signal to an input terminal of switch 56. Line 82 includes a 2.7K resistor 84 and is tied through 20K ohm resistor 86 to ground 30. Regulator 42 5-volt output line 55 is connected through a 10K resistor 88/20K resistor 98 divider to a "continuous" illumination input line 90 of user-controllable select switch 56.

Modulation cycle control circuit 46 produces a "duty cycle modulation waveform" on line 48 for input to level-shifting buffer circuit 50. The buffer includes an op amp 100, preferably part #LM358N, with a feedback network formed by a 3.3K ohm resistor 102 and a 10K ohm resistor 104. Buffer 50 amplifies input waveforms to between 0.8 volts and 2.0 volts for output signals on line 38.

Figure 4:
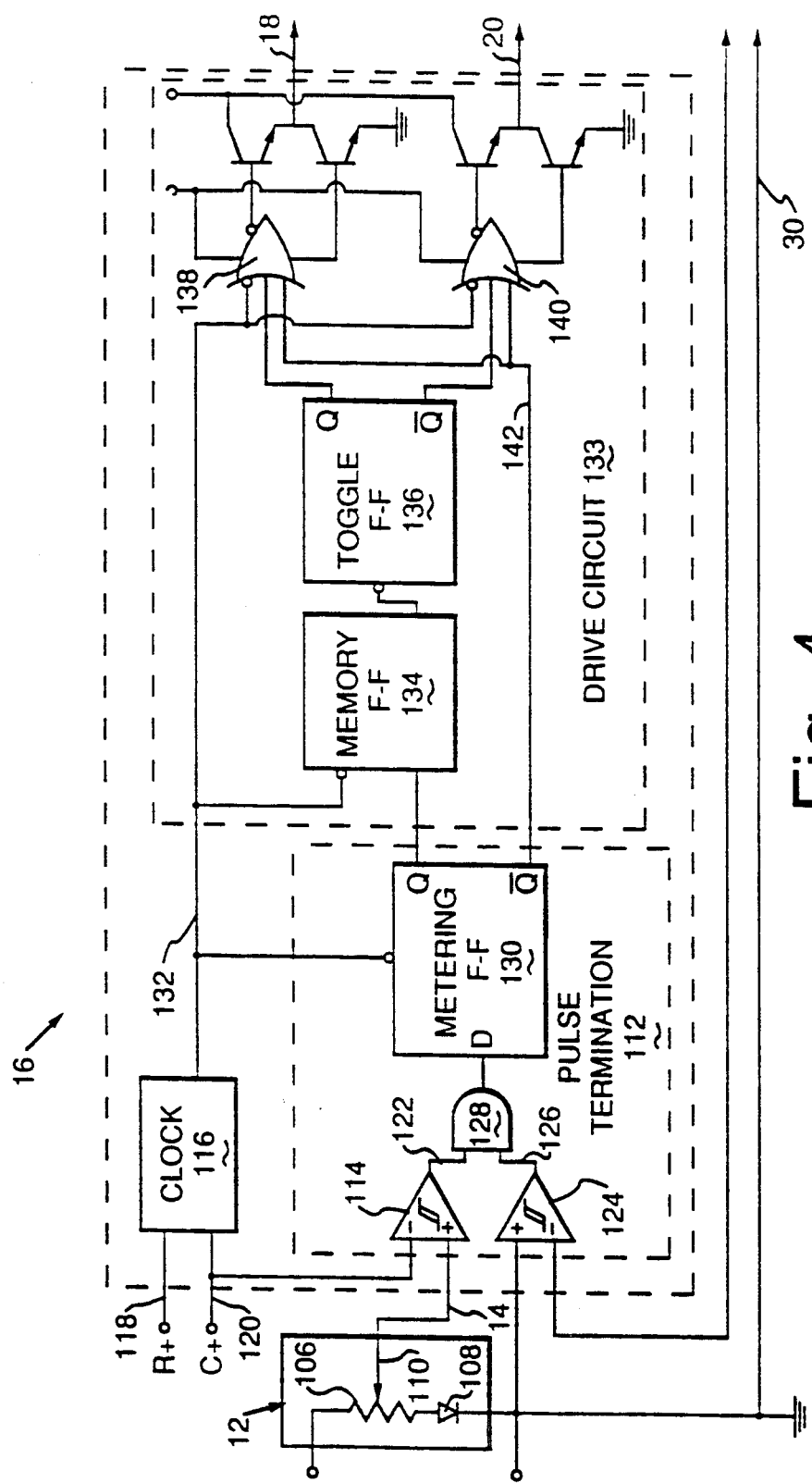
FIG. 4 is a more detailed schematic of the duty cycle modulation circuit shown in FIG. 2.

Referring to FIG. 4, intensity adjustment circuit 12 couples signal line 38 input waveforms through variable resistor 106, preferably a user-adjustable 10K potentiometer, and a diode 108 (IN4148) to ground line 30. Variable resistor 106 is swept by wiper arm 110 which conducts current as the duty cycle modulation voltage output on line 14.

Duty cycle modulation circuit 16 is preferably an SG3526 PWM IC. Inside circuit 16, the line 114 duty cycle modulation voltage is received by pulse termination circuit 112 at the input of a differential error amplifier (not shown) which has its negative reference input line at the ground potential. Duty cycle modulation voltages received on line 14 pass through the error amplifier to one input of comparator 114. The clock 116 signal frequency (FIG. 5a) is fixed by the values of a timing resistor Rt (preferably around 4K ohms) connected at terminal 118, and of a timing capacitor Ct (preferably 0.01 uf) connected at terminal 120. Clock 116 produces a sawtooth voltage waveform (not shown) on line 120 which is applied to the negative input terminal of comparator 114. When the clock line 120 sawtooth voltage rises above a preset threshold approaching the duty cycle modulation voltage received on line 14, amplifier 114 outputs a high ("true") signal on line 122 which, as long as the optional sense amplifier 124 output line 126 signal remains high, is passed through AND gate 128 to the D-input terminal of metering flip-flop 130.

At the same time, clock 116 output line 132 CLK signal rising edges reset metering flip-flop 130.

Clock 116 rising signal edges input to drive circuit 133 also reset memory flip-flop 134. The memory flip-flop 134 output signal /Q is applied to input terminal T of toggle flip-flop 136, which in effect divides the clock frequency by two and provides complementary signals at its output terminals Q and /Q.

The clock signal CLK on line 132 and the toggle flip-flop complementary output signals Q and /Q are each applied to NOR gates 138 and 140. As long as AND gate 128 continues to output a high level signal to the D-input terminal of metering flip-flop 130, metering flip-flop 130 output /Q line 142 remains high, allowing either, but not both, of NOR gates 138 and 140 to pass the high CLK signal to output line 18 or 20, respectively.

The CLK signal on line 132 in period No. 1 (FIG. 5a) produces a high drive enabling signal (FIG. 5b) on line 18 from NOR gate 138 which is later disabled by a low-going line 142 signal output from pulse termination circuit 112. The succeeding period No. 2 of the CLK signal on line 132 again sets memory flip-flop 134, which toggles flip-flop 136 and applies a high signal on its /Q output line to NOR gate input line 140, which similarly maintains a high output pulse (FIG. 5c) on line 20 until being disabled by a high level line 142 signal output from pulse termination circuit 112.

Figure 6:
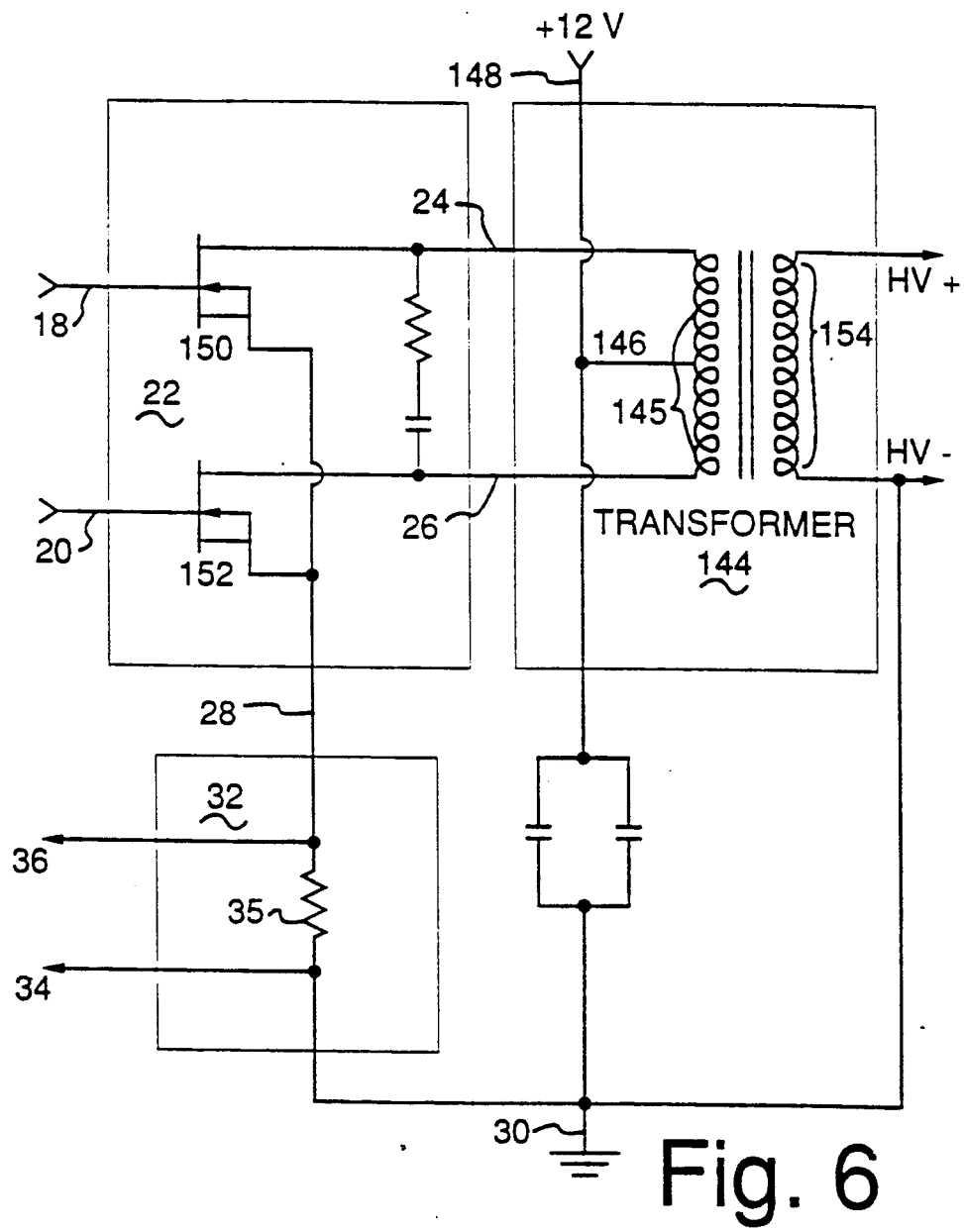
FIG. 6 is a more detailed schematic of the driver, transformer, and current detection circuits of the power supply.

Referring to FIG. 6, driver 22 output leads 24 and 26 are connected to opposite ends of the primary winding of a transformer 144, which may be "U-core" or "E-core" type having a center tap 146 connected to direct current supply line 148, whereby, in proportion to duty cycle modulation voltage line 38 inputs, driver circuit 22 conducts current from the primary coil 145 to ground 30. Thus, during odd-numbered CLK periods, driver FET 150 is enabled and establishes a conduction path for current (FIG. 5b) out the top lead 24 of primary coil 145 from center tap supply line 146 to direct current supply 148.

Alternately, during even-numbered CLK periods, NOR gate 148 produces a high transformer driver waveform on line 20 to FET 152 which establishes a conduction path for current (FIG. 5c) out bottom lead 26 of primary coil 145 from center tap 146, which is connected to direct current supply 148. Current (FIG. 5d) through power FETs 150 and 152 is conducted through line 28 and optional current detector resistor 35 to ground line 30, producing a waveform as shown in FIG. 5e.

Meanwhile, current flowing upward through the top half of primary coil 145 during odd-numbered periods of clock 116 signal CLK and flowing downward through the bottom half of primary coil 145 during even-numbered periods induces, in secondary coil 154, alternating current as shown by the waveform of FIG. 5e. Modulation of the transformer secondary coil current according to the duty cycle modulation voltage input determines the average intensity of light output by a neon or fluorescent tube (not shown) connected between transformer secondary coil lines HV+ and HV−.

The FETs 150 and 152 are high performance DMOS devices which internally are more planar in construction than other power FETs and have little if any undercuttings of their thick field oxide through which conduction occurs. These devices generally exhibit an RDS(ON) of between 0.2 and 0.27 ohms. Therefore, they are capable of high energy absorption under unclamped inductive load switching. Generally, the devices used in the prior art have between 2.2 and 5.5 ohms RDS(ON) and are not capable of the high energy switching required. The end result is that at relatively high currents of 18–20 mAmps the prior art devices burn up.

As will be explained below transformer 144 is also of a novel design which renders it capable of cooperating with FETs 150 and 152 to achieve heretofore unrealized operational results.

Turning now to FIGS. 7 and 8 of the drawing, a similar AC circuit is depicted which is energized by 110V input line voltage. In FIG. 7 the power supply for the AC circuit is depicted at 200 and is of conventional design. Basically, the supply converts input AC line voltage to 170 volt DC at terminal 202, 12 volt DC at terminal 204, and regulated 5 volt DC at terminal 206.

Like the 12VDC drive, the 110VAC drive has a "front end" circuit comprised generally of a "Flash and write clock" 210, a "level shifter" 212, and "intensity control" 214, a modulating circuit 216, a frequency clock trim circuit 218 and an SG3526N modulated switching control IC 220.

After the switching control 220, the similarity to the 12VDC circuit ceases due to the fact that the 12VDC unit is run in a push-pull mode and the 110VAC unit is run in ½ Bridge mode using a toroidal transformer 222 to drive the FETs 224 and 226.

Whereas the 12VDC unit supplies 2.7 kV max at approximately 16 mA, in order to surpass this boundary (set by the fact that at higher power levels the primary of a push-pull circuit must be accurately balanced within parameters that would prove impractical to achieve in production quantities) the ½ Bridge circuit drive was developed. The drive circuit consists of the coupling transformer 222 from the output of the 3526, a coupling capacitor 223 in the form of a 1 mf non-polar type, and a diode clamp 225 to prevent negative going signals greater than 0.2V at IC220 causing IC220 to "latch-up".

A most important consideration is the RDS(ON) which simply is the Drain to Source "ON" resistance of the IRFP Series power FET transistors 224 and 226. In standard transistors, RDS(ON) can be a troublesome factor exhibited in extreme heat produced by the required 1.5-2 AMP current input to the primary of the output transformer 228. In standard NPN or PNP devices, RDS(ON) increases exponentially with heat. For example, as heat increases, RDS(ON) increases to a final point of destruction of the drive devices. Power FET devices with relatively stable RDS(ON) DMOS FETs were used. Because of the FET construction, silicon dice size, and inherent avalanche protection, RDS(ON) is quite stable throughout the entire operating range. Therefore, high losses, due to extreme heating are eliminated at higher power output levels of 8.5 kV at 24 mA and 12.0 kV at 30 mA.

Inductive and capacitive losses, exhibited in high heat profiles of power transformers, are factors which must be balanced. Furthermore, overall unit construction must be taken into consideration when designing high output devices. The simplest way to reduce inductive interaction between primary and secondary is to separate windings. In effect, that is exactly why a "U" core envelope was chosen for the transformer 230. As depicted in more detail in FIG. 9, this type of core physically separates primary 232 from secondary 234 which optimize the overall design, at high power, for minimum inductive interactance. However, the physical separation does not reduce inherent capacitive loss due to proximity of conductor magnetic fields in parallel wires, which capacities couple unless a means is devised to phase balance the wiring. As in twisted wires, appropriate attenuation of coupling is achieved by dissimilar phases cancelling each other out. In effect, universal winding of the secondary of transformer 230 achieves the same cancellation or minimization of capacitive coupling. This is accomplished by diagonally winding each layer opposite the adjacent layer of wire, twisting the conductor together, to achieve the 90% phasing shift required for cancellation of coupling. The end result is to achieve very low $\Delta t$ (temperature change) in the secondary over ambient (reduced secondary heating).

The primary 232 was likewise observed to have high $\Delta t$ with conventional stranding. It was noted that this was not due primarily from capacitive loss as expected, but from resistance of the winding itself. Therefore, "Litz" wire was chosen as the material of choice due to the face that it contains 30 times the number of strands used in standard AWG wire. Before Litz wire was used, the primary had actually succumbed to thermal loading due to skin effect at 20kHz. With the number of strands increased, the operational area of wire in the primary (current capacity) was increased and therefore heating increase, exhibited due to coil resistance, was reduced.

The above approach to transformer construction enables the present invention to deliver full power to the load and is minimally subject to inherent loss due to resistive or capacitive loading.

In addition to the above, it was necessary to address the problem of corona and full ionization resulting in arc-over. To maintain the proper balance of distance (to any available ground plane) to RF leakage, the secondary 234 must be encapsulated in a compound with a Cr (coefficient of resistance) less than 3.2, with physical coverage equaling at least 3/16"/1 kV free air. To accomplish this, a unit would either have to be large in size or be encapsulated with a compound that equates 3/16"/1 kV to a reduced dimension. Solid epoxy, as a rule, runs in the 4.0 to 4.5 Cr range, and a resultant RF path to any ground plane causes heating and power low. A model or electrical equivalent for epoxy encapsulation is a classic parallel resistive circuit, the RF leakage following a high resistance path through the epoxy encapsulant, but not high enough at 20kHz to qualify as an insulator, in parallel with the secondary coil 234 of the transformer. RF leakage results in heat buildup and parasitic shunting of the high voltage output coil, therefore, less current out to the load and RF heating to the envelope due to the high Cr of the encapsulant. To avoid this problem a "Permigile" 27-17 silicon compound was chosen for its low Cr less than 3.2. An encapsulation of only 0.375 accomplished both insulation and isolation at 20 kHz to any ground planes with minimum RF losses.

In the preferred embodiment, the transformer 230 is potted separately in a potting shell installed in the unit and then over potted in place.

In accordance with the present invention, the output transformer 144 for the 12VDC driver includes a center-tapped primary and a universal wound single coil secondary. The 110VAC driver uses a single coil primary and a dual coil universal wound, pi network, secondary.

These techniques allow a greater driver capacity, approximately 15-20% longer 15 mm neon tubing drives, plus greater brightness due to maximizing current delivery (approximately 30% brighter than prior art devices).

While the present invention has been described in terms of a preferred embodiment, it will be appreciated by those skilled in the art that this embodiments may be modified without departing from the essence of the invention. It is therefore intended that the following claims be interpreted as covering any modifications falling within the true spirit and scope of the invention.

What is claimed is:

1. In a power supply apparatus for driving gas discharge devices and the like with relatively high frequency voltages including transformer means having a primary winding and a secondary winding across which a device to be powered may be connected, transistorized switching means connected to said primary winding for providing pulses of alternating polarity thereto when driving, pulse width modulator drive means for driving said switching means at an RF frequency, and means for selecting the width of said drive pulses to control the power applied to the device to be powered, an improved transformer means comprising:
  a pair of U-shaped core members having their corresponding ends joined together to form a unitary core for said transformer;
  a primary winding wound about one side of said core and overlying a first junction of said pair of core members;
  a secondary winding wound about an opposite side of said core and overlying a second junction of said pair of core members; and
  potting means having a coefficient of resistance of 3.2 or less disposed about said secondary winding to inhibit power loss due to RF leakage from the secondary winding to a relative ground plane.

2. In a power supply apparatus as recited in claim 1 wherein said primary winding is a center tapped winding formed of Litz wire for the purpose of reducing the resistance of the primary winding.

3. In a power supply apparatus as recited in claim 2 wherein said secondary winding includes a single universal wound coil.

4. In a power supply apparatus as recited in claim 3 wherein said potting means is comprised of a silicon compound.

5. In a power supply apparatus as recited in claim 4 wherein said U-shaped core members are taped together to balance the interactive inductance and capacitance between the primary and secondary windings.

6. In a power supply apparatus as recited in claim 1 wherein said primary winding is a single coil wound of Litz wire for the purpose of reducing the resistance of the primary winding.

7. In a power supply apparatus as recited in claim 6 wherein said secondary winding includes a pair of universal wound, pi network, coils.

8. In a power supply apparatus as recited in claim 7 wherein said potting means is comprised of a silicon compound.

9. In a power supply apparatus as recited in claim 8 wherein said U-shaped core members are taped together to balance the interactive inductance and capacitance between the primary and secondary windings.

10. In a power supply apparatus as recited in claim 1 wherein said switching means is connected to said drive means by a ½ bridge circuit including a coupling capacitor, a diode clamp and a toroidal transformer.

11. In a power supply apparatus as recited in claim 10 wherein said switching means includes a pair of power FETs and said toroidal transformer includes a single primary winding, and a pair of secondary windings each of which is connected across the gate and drain of one of said FETs.

12. In a power supply apparatus as recited in claim 1 wherein said switching means is connected to said drive means in a push-pull configuration.

13. In a power supply apparatus as recited in claim 1 wherein said switching means includes a pair of high performance DMOS FET devices exhibiting RDS(ON) of between 0.2 and 0.27 ohms.

14. In a power supply apparatus as recited in claim 5 wherein said switching means includes a pair of high performance DMOS FET devices exhibiting RDS(ON) of between 0.2 and 0.27 ohms.

15. In a power supply apparatus as recited in claim 9 wherein said switching means includes a pair of high performance DMOS FET devices exhibiting RDS(ON) of between 0.2 and 0.27 ohms.

16. In a power supply apparatus as recited in claim 11 wherein said switching means includes a pair of high performance DMOS FET devices exhibiting RDS(ON) of between 0.2 and 0.27 ohms.

17. In a power supply apparatus as recited in claim 12 wherein said switching means includes a pair of high performance DMOS FET devices exhibiting RDS(ON) of between 0.2 and 0.27 ohms.

18. In a power supply apparatus as recited in claim 13 wherein said primary winding is a center tapped winding formed of Litz wire for the purpose of reducing the resistance of the primary winding.

19. In a power supply apparatus as recited in claim 18 wherein said secondary winding includes a single universal wound coil.

20. In a power supply apparatus as recited in claim 19 wherein said potting means is comprised of a silicon compound.

21. In a power supply apparatus as recited in claim 13 wherein said primary winding is a single coil wound of Litz wire for the purpose of reducing the resistance of the primary winding.

22. In a power supply apparatus as recited in claim 21 wherein said secondary winding includes a pair of universal wound, pi network, coils.

23. In a power supply apparatus as recited in claim 22 wherein said potting means is comprised of a silicon compound.

24. In a power supply apparatus as recited in claim 12 wherein said primary winding is a center tapped winding formed of Litz wire for the purpose of reducing the resistance of the primary winding.

25. In a power supply apparatus as recited in claim 24 wherein said secondary winding includes a single universal wound coil.

26. In a power supply apparatus as recited in claim 25 wherein said potting means is comprised of a silicon compound.

27. In a power supply apparatus as recited in claim 10 wherein said primary winding is a single coil wound of Litz wire for the purpose of reducing the resistance of the primary winding.

28. In a power supply apparatus as recited in claim 27 wherein said secondary winding includes a pair of universal wound, pi network, coils.

29. In a power supply apparatus as recited in claim 28 wherein said potting means is comprised of a silicon compound.

30. In a power supply apparatus as recited in claim 29 wherein said U-shaped core members are taped together to balance the interactive inductance and capacitance between the primary and secondary windings.

* * * * *